United States Patent [19]

Reuschel et al.

[11] 4,097,584
[45] Jun. 27, 1978

[54] METHOD OF PRODUCING SILICON USEFUL FOR SEMICONDUCTOR COMPONENT MANUFACTURE

[75] Inventors: Konrad Reuschel, Vaterstetten; Norbert Schink, Munich, both of Germany

[73] Assignee: Siemens Aktiengesellschaft, Berlin & Munich, Germany

[21] Appl. No.: 798,442

[22] Filed: May 19, 1977

[30] Foreign Application Priority Data

May 25, 1976 Germany .............................. 2623413

[51] Int. Cl.² ...................... C01B 33/02; C01B 35/08; C01B 35/10; C01B 25/06
[52] U.S. Cl. .................................... 423/348; 423/278; 423/290; 423/299; 423/DIG. 12
[58] Field of Search ............... 423/348, 290, 278, 299, 423/350

[56] References Cited

U.S. PATENT DOCUMENTS

| 1,180,968 | 4/1916 | Brockbank | 423/348 |
| 2,402,662 | 6/1946 | Ohl | 423/348 X |
| 3,008,887 | 11/1961 | Herglotz | 423/348 |

FOREIGN PATENT DOCUMENTS

| 209,302 | 7/1957 | Australia | 423/348 |
| 1,103,329 | 2/1968 | United Kingdom | 423/348 |

*Primary Examiner*—Edward Stern
*Attorney, Agent, or Firm*—Hill, Gross, Simpson, Van Santen, Steadman, Chiara & Simpson

[57] ABSTRACT

Technical-grade silicon is purified to produce silicon having less than 1 ppm of electrically effective impurities therein, particularly boron and phosphorus, by treating molten technical silicon with a hydrogen containing gas in the presence of water so as to remove such impurities from the molten silicon.

4 Claims, 1 Drawing Figure

U.S. Patent
June 27, 1978
4,097,584
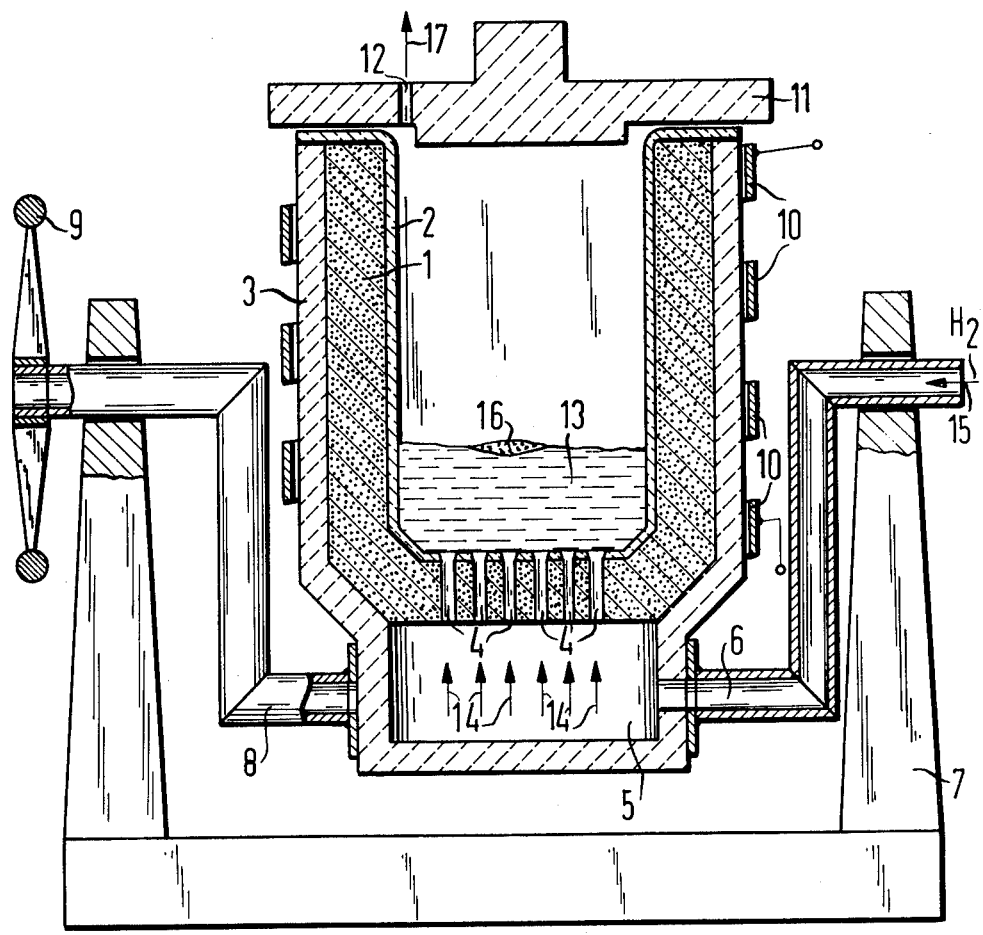

4,097,584

METHOD OF PRODUCING SILICON USEFUL FOR SEMICONDUCTOR COMPONENT MANUFACTURE

BACKGROUND OF THE INVENTION

1. Field of the Invention

The invention relates to silicon production and somewhat more particularly to a method of producing silicon having less than 1 ppm of electrically effective impurities therein so as to render such silicon useful for semiconductor component manufacture.

2. Prior Art

Technologically useful areas of silicon in the semiconductor art are defined by the degree of purity of the base silicon material. It is known that so-called technical-grade silicon (purity of about 98%) may be produced via an electrical arc from quartz sand and carbon. Such technical-grade silicon is economical, however, it contains impurities, such as iron, boron, phosphorus, etc., rendering such silicon unsuitable for semiconductor component manufacture. Boron and phosphorus are particularly detrimental when present in silicon from which silicon semiconductor components are to be produced because these elements decisively effect the conductivity characteristics of semiconductor materials. Accordingly, in order for technical-grade silicon to be useful for semiconductor component manufacture, it is necessary to purify such silicon so that it contains less than 1 ppm of electrically effective impurities, particularly boron and phosphorus, therein.

SUMMARY OF THE INVENTION

The invention provides a method of purifying technical-grade silicon by removing electrically effective impurities therefrom, particularly boron and phosphorus, so that less than 1 ppm of electrically effective impurities remain in the so-purified silicon rendering it useful as a base material for semiconductor component manufacture, particularly components having relatively simple electrical requirements, such as autodiodes or solar cells.

In accordance with the principles of the invention, molten technical-grade silicon is treated with a hydrogen-containing gas, i.e., containing hydrogen or a gaseous compound having hydrogen therein, in the presence of water so that electrically effective impurities are removed from the molten silicon. In instances where such electrically effective impurities are phosphorus and boron, phosphorus is removed or escapes from the molten silicon principally in the form of phosphorus hydrogen while the boron is removed as boron oxide in the slag that forms on the molten silicon.

In one embodiment of the invention, a hydrogen-containing gas stream having water vapor therein is passed or blown through a body of molten technical-grade silicon. In such embodiment, the amount of hydrogen within the stream … be diluted to a hydrogen share of less than 1% by an inert gas, preferably a pure noble gas. The amount of water vapor within such stream is typically not more than 10%.

In another embodiment of the invention, small amounts of ammonium hydroxide, preferably 0.1% maximum, are admixed with the hydrogen-containing stream, which, as indicated above, may contain pure hydrogen or a gaseous compound having hydrogen therein, along with water vapor. This embodiment of the invention allows a further reduction of boron from the molten technical-grade silicon since the presence of ammonium in the gas stream used to treat the molten technical-grade silicon causes boron to be slagged as boric nitride, rather than boron oxide, although it is advantageous to combine both methods.

The purification effect of the inventive process is further increased by conducting such process under subatmospheric (i.e., negative) pressure. Typically, the pressure within a reaction chamber is set so as to range from about 100 to 300 Torr. During the process, the reaction chamber is maintained at a temperature in the range of about 1420° to 1480° C., typically by induction-heating.

BRIEF DESCRIPTION OF THE DRAWINGS

The single FIGURE is a somewhat schematic, partially cross-sectional, view of an apparatus useful in the practice of the invention.

DESCRIPTION OF THE PREFERRED EMBODIMENTS

The invention provides a method of purifying technical-grade silicon of electrically effective impurities, particularly boron and phosphorus, so as to yield a silicon base material having less than 1 ppm of such impurities therein so as to render such base material suitable for manufacture of relatively simple semiconductor components, for example, such as autodiodes or solar cells.

In accordance with the principles of the invention, molten technical-grade silicon is treated with a hydrogen-containing gas in the presence of water sufficiently to remove an amount of such impurities from the technical-grade silicon so that less than 1 ppm of such impurities remain in the so-treated silicon.

In preferred embodiments of the invention, the gas stream containing at least hydrogen and water vapor is forced through a body of molten technical-grade silicon whereby most, if not all, phosphorus present within such technical-grade silicon escapes therefrom, primarily in the form of phosphorus hydrogen (phosphorus hydrogen compound) and most, if not all, boron present within such technical-grade silicon is converted to boron oxide and remains in the slag that forms on the molten silicon body.

In specific embodiments of the invention, a hydrogen-containing gas stream (i.e., containing hydrogen or a gaseous compound having hydrogen therein) along with a relatively small amount of water vapor is fed, under pressure, through a body of molten technical-grade silicon, for example, confined within a reaction chamber. The amount of hydrogen within such a hydrogen-containing gas stream is variable in accordance with the amount of impurities present within the silicon material being treated, however, the amount of hydrogen within such a gas stream is preferably at least 1% and a major component (i.e., more than 90%) is an inert gas. A specific exemplary hydrogen-containing gas mixture comprises 1% of hydrogen and the remainder an inert gas, preferably a noble gas.

The hydrogen-containing gas stream preferably contains water or water vapor therein. The amount of water or water vapor within a given hydrogen-containing gas stream is variable, however, a specific amount of water is required, generally not more than 10% and preferably so that the ratio of hydrogen to water within a gas stream is about 10:1. A specific exemplary gas mixture suitable in the practice of the invention may comprise about 1% hydrogen, about 0.1% water and the remainder an inert gas, such as argon.

In certain embodiments of the invention, the hydrogen-containing gas stream as defined hereinabove used for treating molten technical-grade silicon may also contain relatively small amounts of ammonium hydroxide therein, preferably about 0.1% maximum and more preferably at a ratio of ammonia to water of about 1:10. In embodiments where ammonia is present in the hydrogen-containing gas stream, the boron is not slagged as boron oxide but rather as boric nitride which can be more readily handled as boron oxide is relatively water insoluble. Typically, both boron compounds form so that in these embodiments the boron content within a so-processed silicon material is considerably reduced.

The purification process of the invention may be further aided by conducting such process under a negative or subatmospheric pressure. Generally, the pressure within a reaction chamber is regulated so as to be in the range of about 100 to 300 Torr and is preferably at about 100 Torr.

The purification process of the invention must typically be carried out at elevated temperatures, i.e., above the melting point of silicon (1420° C.) but below temperatures at which molten silicon may react with the material forming the reaction chamber (i.e., below about 1480° C.). Accordingly, the reaction chamber is maintained at a temperature in the range of about 1420° to 1480° C. and preferably at about 1450° C.

Referring now to the drawing, a graphite container 1 having a quartz lining 2 is placed within an aluminum oxide shell 3 so that the bottom wall of the graphite container 1, which is provided with a plurality of gas openings 4, rests on inwardly extending surfaces of shell 3 above the bottom wall thereof, as shown. In this manner, a gas chamber 5 is defined between the graphite container 1 and the aluminum oxide shell 3.

A gas inlet means 6, for example, comprised of a steel pipe, is provided in communication with the interior of gas chamber 5 to guide a suitable hydrogen-containing gas stream 15 from a pressure-regulated source (not shown) to the chamber 5. As shown, the gas inlet means may be secured, as by welding, to a lateral wall of gas chamber 5 so as to constitute a support and swivel arm for the reactor housing (comprised of elements 1, 2 and 3). The gas inlet means 6 or swivel arm is suitably mounted within a steel frame 7 so that the pipe may rotate along a horizontal axis thereof. A similar (mirror-inverted) pipe or swivel arm 8 may be similarly attached and mounted on the opposite side of the reactor and be provided with a handle or swivel device 9 mounted along a horizontal axis thereof outside the frame 7 to enable an operator to selectively tilt or swivel the reactor when desired. An induction heating means 10 is provided along the exterior walls of the reactor and is operationally coupled to a controllable energy source so as to maintain a reaction chamber within the reactor at a desired temperature in the range of about 1420° to 1480° C. and typically at 1450° C. In the embodiment illustrated, a loosely fitting cover member 11, for example, composed of aluminum oxide, may be provided for closing the reaction chamber from ambient atmosphere. The cover member 11 may be provided with a vent means 12 to allow gases to be removed, as by burning. Of course, in embodiments where subatmospheric pressure is utilized within the raction chamber, such cover member and vent means may be modified in a manner well known by workers in the art so as to maintain a desired subatmospheric pressure within the reaction chamber.

The reaction chamber (i.e., the interior of graphite container 1) is provided with a select amount of molten silicon material 13 to be purified, typically technical-grade silicon. The molten silicon material is prevented from escaping from the reaction chamber by controllably feeding a hydrogen-containing gas stream 14 from the gas chamber 5 upwardly through the openings 4. By proper control of the gas stream velocity, any desired amount of molten silicon may be kept within a given reaction chamber. For example, in instances where the capacity of a reaction chamber for technical silicon is about 20 kilograms, the hydrogen-containing gas stream (containing at least hydrogen and water) is passed at a controlled velocity through openings 4 at about 1 to 10 liters per second and preferably at about 5 liters per second. Of course, when another size reaction chamber is utilized, the gas stream flow velocity may be suitably adjusted, as those skilled in the art will appreciate. Accordingly, the hydrogen-containing gas stream is passed through a confined body of molten silicon at a controlled flow velocity proportioned to a flow velocity of about 1 to 10 liters per second per a 20 kilogram mass of molten silicon.

In the course of the purification reaction, a slag 16 forms on top of the molten silicon and such slag contains, among other things, boron removed from the technical-grade silicon as boron oxide or boron nitride (in instances where ammonium was present in the hydrogen-containing stream passing through such molten silicon) as well as other residue. The phosphorus which was present in the technical-grade silicon is removed during the course of the reaction, mostly as hydrogen phosphorus and passes, along with any other gases, such as pure phosphorus or small amounts of silicon monoxide, through vent means 12 (diagrammatically indicated by arrow 17) and may be burned off or otherwise disposed of.

By practicing the principles of the invention, one may simply and economically produce silicon of sufficient purity, relative to electrically effective impurities, that the so-processed silicon may be utilized as a base material for the manufacture of relatively simple semiconductor components, such as solar cells or autodiodes.

The refined silicon obtained by the practice of the invention may be expediently cast into suitable plates or bodies or be formed into a band or ribbon-shape and then cut to desired size by suitable means. For example, after sufficient impurities have been removed from a confined molten silicon body within an apparatus such as illustrated in the drawing, such reactor may be simply tilted while the silicon is still in a molten state so that it readily flows into suitable molds or the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. A method of producing silicon having a boron and phosphorous content of less than 1 ppm so that such silicon can be utilized for manufacture of silicon components, comprising:

confining technical-grade silicon in a reaction chamber heated to a temperature in the range of 1420° to 1480° C. so as to produce a silicon melt within said chamber, said technical-grade silicon having an amount of boron and phosphorous therein greater than 1 ppm; and providing a stream of hydrogen-containing gas having at least 0.1% water vapor, at least 1% hydrogen and an inert gas therein and controllably passing said stream through said silicon melt within the reaction chamber so that an amount of phosphorous escapes from such silicon melt as gaseous phosphorus hydrogen compound and is removed from said melt via exhaust gases from said reaction chamber and an amount of boron escapes from such silicon melt as boron oxide and is removed from said melt in a slag that forms on top of said silicon melt, which slag is removed.

2. A method as defined in claim 1 wherein said stream of hydrogen-containing gas includes not more than 0.1% of ammonium hydroxide therein so that when such gas stream is controllably passed through said silicon melt an amount of boron escapes from such silicon melt as boron oxide and boron nitride and is removed from said melt in a slag that forms on top of said silicon melt, which slag is removed.

3. A method as defined in claim 1 wherein said reaction chamber is maintained under a pressure ranging from about 100 to 300 Torr.

4. A method as defined in claim 1 wherein said stream of hydrogen-containing gas is passed through said silicon melt at a controlled flow velocity proportional to a flow velocity of 1 to 10 liters per second per a 20 kilogram mass of silicon melt.

* * * * *